July 27, 1948.                I. ROSSI ET AL                2,445,889
                           THERMOPLASTIC BELT
                           Filed July 12, 1944
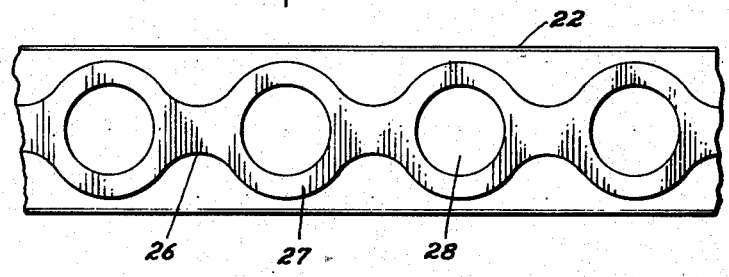
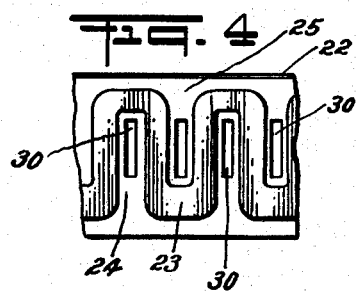
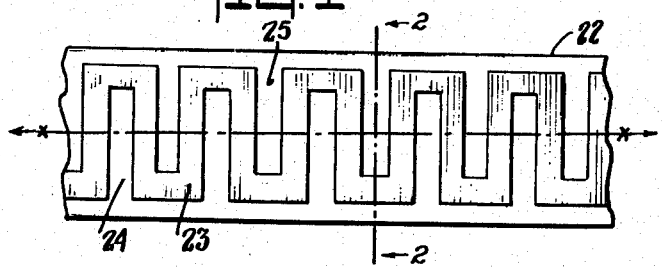
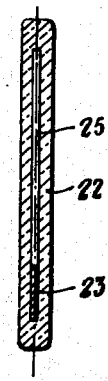
INVENTORS
IRVING ROSSI & WILLIAM DUBILIER
BY
ATTORNEY Patented July 27, 1948

2,445,889

UNITED STATES PATENT OFFICE 2,445,889

THERMOPLASTIC BELT

Irving Rossi, West Orange, N. J., and William Dubilier, New Rochelle, N. Y.

Application July 12, 1944, Serial No. 544,614

3 Claims. (Cl. 2—338)

The present invention relates to belt constructions, more particularly to belts made of thermoplastic material and among the objects of the invention is to generally improve the mechanical and elastic properties of a belt of this type.

Thermoplastic or equivalent materials are both cheap and attractive and can be easily formed or molded to any desired shape. Their use has, however, been limited in the past to such cases where only a limited mechanical strength and elasticity were required due to the low elastic limit and lack of other desirable mechanical characteristics of these materials. In particular, if subjected to tensile stress such as in the case of belts or straps, the material would follow only slowly and gradually an applied force or removal of said force, thus making its use impractical and prohibitive for many applications where a quick acting spring action free from fatigue effects and other improved mechanical characteristics such as high strength were required.

Accordingly, more specific objects of the present invention are to generally improve the mechanical characteristics of a belt made of thermoplastic material to extend its usefulness in practice; to increase the mechanical strength of a belt of this type; and to impart additional resiliency or quick acting spring action in the longitudinal direction of the belt.

The thermoplastic materials may be composed of any of the class of known synthetic products such as cellulose derivatives, vinyl resins, acrylite and methacrylite resins, polystyrene, polyamide plastics and similar synthetic and natural thermoplastic or equivalent materials known in the art.

The invention will become more apparent from the following detailed description taken in reference to the accompanying drawing forming part of this specification and wherein:

Figure 1 shows a flexible belt or strap constructed in accordance with the invention;

Figure 2 is an enlarged cross-section taken on line 2—2 of Figure 1; and

Figures 3 and 4 illustrate modifications of belt structures according to the invention.

Like reference characters identify like parts in the different views of the drawing.

With the aforementioned and other objects in view, as will appear from the following description, the present invention involves generally the provision of a resilient or springy metallic insert completely embedded in the thermoplastic material of a belt and designed to provide the necessary mechanical strength and quick-acting resiliency in the longitudinal direction of the belt. More particularly, the invention proposes the provision of a thin expansible and contractile metal strip or band having a series of slots or perforations and being embedded in the thermoplastic material to provide the required additional mechanical strength and quick acting spring action of the composite material which the thermoplastic material alone lacks. Other advantages gained by the invention will be in part obvious and will in part become apparent from the description and exemplification of the invention as shown and disclosed.

Referring to Figure 1, there is shown a portion of a flexible belt or strap constructed in accordance with the invention and suited for numerous uses and applications where a quick acting spring action and mechanical strength are required, such as suspenders, belts, watch straps, etc., or generally in connection with any type of flexible strip or band for various uses and purposes.

The thermoplastic material lends itself readily to the mounting of locks, clasps, buckles and other fastening elements and if necessary additional strength can be obtained by securing the fastening devices to the metal strip embedded in the thermoplastic. Item 22 in Figure 1 represents a strip or belt of thermoplastic material having embedded therein a thin resilient metal strip 23 punched from sheet metal and having a thickness of a few thousandths of an inch. The strip 23 is formed with a series of transverse slots 24 and 25 alternately extending to the opposite edges thereof and overlapping each other in the center in such a manner as to impart additional mechanical strength and quick-acting resiliency in the longitudinal direction to the composite belt structure. For this purpose, the width of the solid material of the metal member 23 between two adjacent slots 24 and 25 should be a multiple of the thickness of the strip, as is readily understood and shown in the drawing.

According to one method of making strip material of this type either in definite or continuous lengths, two strips or webs of thermoplastic material are placed on opposite sides of the punched out metal strip of steel, or other resilient metal, and the two thermoplastic strips are consolidated into a single strip by heat treatment and if necessary slight mechanical pressure, whereby to enclose or embed the reinforcing member in the manner shown in Figure 2. Alternatively, the two thermoplastic strips may be united by cementing or in any other suitable manner.

The belt constructed in the manner described will expand easily when subjected to a longitudinal force and return substantially instantly to its original shape upon removal or relaxation of the applied force. The stiffness or elasticity of the belt will be dependent for any given material upon its thickness and cross-section as well as the number and depth of the slots or other openings which according to the invention extend beyond the center line or overlap each other to prevent any longitudinal line to run continuously through the metal insert embedded in the thermoplastic strip. Furthermore, the metal insert being permanently embedded in the plastic material, will be prevented from buckling or getting out of shape laterally and is protected by the thermoplastic material against corrosion, oxidation and other undesirable influences. This results in long life and additional advantages, as will be understood.

Figure 3 shows a modified belt structure according to the invention wherein the reinforcing metal strip 27 is formed with wavelike longitudinal edges 26 and provided with a series of central openings or perforations 28 arranged in such a manner as again to prevent a continuous longitudinal line to run through the metal parts of the strip and to provide a desired resiliency or spring action in the longitudinal direction of the belt.

Figure 4 shows a modification of a belt structure of the type according to Figure 1 wherein the transverse and longitudinal portions of the metallic strip are connected by round edges to further improve the resiliency and spring action. In addition, the completed belt or strap is provided with ventilating slots 30 through the thermoplastic portions to result in reduced perspiration if the strip is intended for use in belts, suspenders, watch straps, etc. In a structure according to Figure 3, the ventilating openings may take advantageously the form of circular apertures (not shown) through the strip and occupy the spaces of the circular openings 28 of the metal strip 27.

According to a further feature of the invention, the reinforcing insert embedded in the thermoplastic material may consist of any other material having a greater elasticity or quick acting spring action compared with the thermoplastic material used to result in the improved function and combined effects to be obtained by the invention. Thus, the insert 23 in Figure 2 may consist of a solid strip of rubber or rubberlike material without the slots 24 and 25, resulting in an improved article of increased elasticity as is readily understood from the above. If rubber is used as an elastic inner or core material, its complete enclosure by the thermoplastic material will prevent deterioration and provide a substantial extension of the life and usefulness of articles or devices constructed in this manner. Furthermore, the rubber strip or body of any other shape may comprise the main portion of the article, in which case the thermoplastic forms a mere thin protective coating to prevent deterioration of the rubber core and to obtain other desirable advantages obvious from the above.

While we have shown and described a few desirable embodiments of the invention, it is understood that this disclosure is for the purpose of illustration and that various changes in shape, proportion and arrangement of parts as well as the substitution of equivalent elements and materials for those shown herein and described may be made without departing from the spirit and scope of the invention as defined in the appended claims. The specification and drawing are accordingly to be regarded in an illustrative rather than in a restrictive sense.

We claim:

1. A belt comprising a strip of flexible thermoplastic material having a thin strip of spring metal completely embedded therein, said metal strip having a series of spaced transverse slots alternately extending to the opposite edges thereof and overlapping each other in the center, the width of the solid portions of said metal strip between adjacent slots being a multiple of the thickness of the strip, whereby to impart additional mechanical strength and quick acting spring action to said belt in the longitudinal direction.

2. A belt comprising a strip of flexible thermoplastic material having a thin strip of spring metal completely embedded therein, said metal strip having a series of spaced transverse slots alternately extending to the opposite edges thereof and overlapping each other in the center, whereby to impart additional mechanical strength and quick acting spring action to said belt in the longitudinal direction, and a series of apertures through the portions of said belt coinciding with said slots.

3. A belt comprising a strip of flexible thermoplastic material having a thin strip of spring metal completely embedded therein, said metal strip having a series of spaced transverse slots alternately extending to the opposite edges thereof and overlapping each other in the center, whereby to impart additional mechanical strength and quick acting spring action to said strip in the longitudinal direction, and a series of transverse slots through the portions of said belt coinciding with said first slots.

IRVING ROSSI.
WILLIAM DUBILIER.

REFERENCES CITED

The following references are of record in the file of this patent:

UNITED STATES PATENTS

| Number | Name | Date |
|---|---|---|
| 233,414 | Hays et al. | Oct. 19, 1880 |
| 267,349 | Hupfel | Nov. 14, 1882 |
| 822,710 | Askew | June 5, 1906 |
| 1,616,950 | Burdette | Feb. 8, 1927 |
| 1,728,912 | Auster et al. | Sept. 24, 1929 |
| 1,905,356 | West | Apr. 25, 1933 |
| 2,074,830 | Conner | Mar. 23, 1937 |
| 2,214,842 | Sweet | Sept. 17, 1940 |
| 2,290,685 | Hickok | July 21, 1942 |